US012476422B2

(12) United States Patent
Valdes et al.

(10) Patent No.: US 12,476,422 B2
(45) Date of Patent: Nov. 18, 2025

(54) ELECTRICAL CONNECTOR WITH COMB-TYPE TERMINAL LOCK

(71) Applicant: Aptiv Technologies AG, Schaffhausen (CH)

(72) Inventors: Eduardo Daniel Alvarez Valdes, Saltillo (MX); Duane Brantingham, Cortland, OH (US); Arturo Casares Valdes, Saltillo (MX); Roberto Carlos Narro Lara, Saltillo (MX)

(73) Assignee: APTIV TECHNOLOGIES AG, Schaffhausen (CH)

( * ) Notice: Subject to any disclaimer, the term of this patent is extended or adjusted under 35 U.S.C. 154(b) by 282 days.

(21) Appl. No.: 18/240,447

(22) Filed: Aug. 31, 2023

(65) Prior Publication Data

US 2024/0088611 A1 Mar. 14, 2024

Related U.S. Application Data

(60) Provisional application No. 63/405,916, filed on Sep. 13, 2022.

(51) Int. Cl.

*H01R 13/641* (2006.01)
*H01R 13/213* (2006.01)

(Continued)

(52) U.S. Cl.

CPC ......... *H01R 13/641* (2013.01); *H01R 13/213* (2013.01); *H01R 13/625* (2013.01);

(Continued)

(58) Field of Classification Search

CPC .. H01R 13/641; H01R 13/213; H01R 13/625; H01R 13/6272; H01R 13/642; H01R 2107/00

See application file for complete search history.

(56) References Cited

U.S. PATENT DOCUMENTS

| | | | |
|---|---|---|---|
| 4,867,712 | A | 9/1989 | Kato et al. |
| 5,478,263 | A | 12/1995 | Kato |

(Continued)

FOREIGN PATENT DOCUMENTS

| | | | |
|---|---|---|---|
| EP | 0790670 | A1 | 8/1997 |

OTHER PUBLICATIONS

"Extended European Search Report for Application No. 23196045.1; European Patent Office; Issued Feb. 14, 2024"; 9 Pages.

*Primary Examiner* — Sean Gugger
(74) *Attorney, Agent, or Firm* — Billion & Armitage

(57) ABSTRACT

An electrical connector includes a connector housing having terminal cavities which are arranged in an array having at least two rows and at least two columns. Each of the terminal cavities are configured to receive electrical terminals. Each terminal cavity defines a flexible primary locking mechanism integrally formed with the connector housing and configured to engage an edge of the electrical terminal, thereby inhibiting removal of the electrical terminals from the terminal cavities. The electrical connector also includes a secondary locking mechanism slidably attached to the connector housing and movable from a pre-staged position to a staged position. The secondary locking mechanism defines a plurality of members configured to extend into the terminal cavities and engage the edge of two electrical terminals when the secondary locking mechanism is in the staged position, thereby further inhibiting removal of the electrical terminals from the terminal cavities.

18 Claims, 10 Drawing Sheets

(51) Int. Cl.

| | |
|---|---|
| ***H01R 13/625*** | (2006.01) |
| ***H01R 13/627*** | (2006.01) |
| ***H01R 13/642*** | (2006.01) |
| *H01R 107/00* | (2006.01) |

(52) U.S. Cl.

CPC ....... *H01R 13/6272* (2013.01); *H01R 13/642* (2013.01); *H01R 2107/00* (2013.01)

(56) References Cited

U.S. PATENT DOCUMENTS

| | | | |
|---|---|---|---|
| 9,160,104 | B2 * | 10/2015 | Neumeuer ......... H01R 13/6272 |
| 11,545,777 | B2 | 1/2023 | Sundarakrishnamachari et al. |
| 2013/0059481 | A1 | 3/2013 | Neumeuer et al. |
| 2020/0112125 | A1 | 4/2020 | Liptak et al. |
| 2022/0006235 | A1 | 1/2022 | Kirschner et al. |

* cited by examiner

ELECTRICAL CONNECTOR WITH COMB-TYPE TERMINAL LOCK

CROSS-REFERENCE TO RELATED APPLICATION

This application claims benefit of priority to U.S. Provisional Patent Application No. 63/405,916 filed on Sep. 13, 2022, the entire disclosure of which is hereby incorporated by reference.

TECHNICAL FIELD

The disclosure generally relates to an electrical connector, particularly to a miniature coaxial connector with a comb-type terminal lock.

BACKGROUND

Limited packaging has driven the need for miniature coaxial connectors. The small connector size of these miniature coaxial connectors causes the secondary lock features to have small pushing surface areas, to be difficult to assemble, and to have poor unseat detection feedback. In miniature coaxial connectors having multiple rows of terminals, for example a 6 way connector having a 3 by 2 terminal cavity configuration and a connector position assurance (CPA) device at the top, cavities are not easily moldable without increasing the size of the connector or including additional components, such as additional secondary locks, in the connector. The difficulties of molding these connectors contribute to a higher cost for the final product. In addition, the poor unseat detection feedback may require connector holders or electrical detection to determine if the terminals are properly seated, thereby further increasing production costs.

SUMMARY

According to one or more aspects of the present disclosure, an electrical connector includes a connector housing having terminal cavities extending therethrough which are arranged in an array having at least two rows and at least two columns. Each of the terminal cavities configured to receive one electrical terminal of a plurality of electrical terminals. Each terminal cavity defines a flexible primary locking mechanism integrally formed with the connector housing and configured to engage an edge of at least one electrical terminal of the plurality of electrical terminals, thereby inhibiting removal of the plurality of electrical terminals from the terminal cavities. The electrical connector further includes a secondary locking mechanism slidably attached to the connector housing and movable from a pre-staged position to a staged position and defining a plurality of members configured to extend into the terminal cavities and engage the edge of at least two electrical terminals of the plurality of electrical terminals when the secondary locking mechanism is in the staged position, thereby further inhibiting removal of the plurality of electrical terminals from the terminal cavities.

In some aspects of the electrical connector described in the previous paragraph, the plurality of members define ridges that engage the edge of at least one of the plurality of electrical terminals when the secondary locking mechanism is in the staged position.

In some aspects of the electrical connector described in any one of the previous paragraphs, the plurality of members include two outer members and at least one inner member. The at least one inner member engages the edges of twice as many of the plurality of electrical terminals as the two outer members.

In some aspects of the electrical connector described in any one of the previous paragraphs, the plurality of members is sized, shaped, and arranged to allow each of the terminal cavities to receive one electrical terminal of the plurality of electrical terminals when the secondary locking mechanism is in the pre-staged position.

In some aspects of the electrical connector described in any one of the previous paragraphs, a side of the plurality of members is scalloped to allow each of the terminal cavities to receive one electrical terminal of the plurality of electrical terminals when the secondary locking mechanism is in the pre-staged position.

In some aspects of the electrical connector described in any one of the previous paragraphs, interference between at least one of the plurality of members and at least one of the plurality of electrical terminals that is not fully inserted within one of the terminal cavities inhibits the secondary locking mechanism from moving from the pre-staged position to the staged position, thereby indicating an improperly seated terminal.

In some aspects of the electrical connector described in any one of the previous paragraphs, the secondary locking mechanism includes a connector locking mechanism configured to attach the electrical connector to a corresponding mating electrical connector and a terminal position assurance device.

In some aspects of the electrical connector described in any one of the previous paragraphs, each of the least two rows of the array contains a first equal number of terminal cavities and each of the least two columns of the array contains a second equal number of terminal cavities.

In some aspects of the electrical connector described in any one of the previous paragraphs, each electrical terminal of the plurality of electrical terminals has a connection end configured to connect with a corresponding mating terminal and an attachment end connected to an electrical cable and wherein the edge of each electrical terminal of the plurality of electrical terminals is closer to the attachment end than the connection end.

In some aspects of the electrical connector described in any one of the previous paragraphs, each electrical terminal of the plurality of electrical terminals has a generally tubular shape.

According to one or more aspects of the present disclosure, a method of assembling an electrical connector includes:

- providing a connector housing having terminal cavities extending therethrough which are arranged in an array having at least two rows and at least two columns;
- inserting at least two electrical terminals of a plurality of electrical terminals into at least two of the terminal cavities;
- engaging a flexible primary locking mechanism integrally formed with the connector housing in each of the terminal cavities with an edge of each electrical terminal of the plurality of electrical terminals, thereby inhibiting removal of each electrical terminal of the plurality of electrical terminals from each of the terminal cavities;
- slidably attaching a secondary locking mechanism to the connector housing; and
- moving the secondary locking mechanism from a pre-staged position to a staged position such that a plurality of members defined by the secondary locking mechanism extend into the terminal cavities and engage the edge of at least one of the plurality of electrical terminals when each of each electrical terminal of the plurality of electrical terminals is fully seated in the terminal cavities, thereby further inhibiting removal of the plurality of electrical terminals from the terminal cavities.

In some aspects of the method described in the previous paragraph, the method further includes inhibiting the secondary locking mechanism from being moved from the pre-staged position to the staged position due to interference between at least one of the plurality of members and at least one of the plurality of electrical terminals that is not fully inserted within one of the terminal cavities, thereby indicating an improperly seated terminal.

In some aspects of the method described in any one of the previous paragraphs, the method further includes repositioning the at least one of the plurality of electrical terminals that is not fully inserted within one of the terminal cavities such that it is fully seated within the terminal cavity.

In some aspects of the method described in any one of the previous paragraphs, the plurality of members include two outer members and at least one inner member and wherein the at least one inner member engages the edges of twice as many of the plurality of electrical terminals as the two outer members.

In some aspects of the method described in any one of the previous paragraphs, the plurality of members is sized, shaped, and arranged to allow each of the terminal cavities to receive one electrical terminal of the plurality of electrical terminals when the secondary locking mechanism is in the pre-staged position.

In some aspects of the method described in any one of the previous paragraphs, a side of the plurality of members is scalloped to allow each of the terminal cavities to receive one electrical terminal of the plurality of electrical terminals when the secondary locking mechanism is in the pre-staged position.

In some aspects of the method described in any one of the previous paragraphs, the secondary locking mechanism includes a connector locking mechanism configured to attach the electrical connector to a corresponding mating electrical connector and a terminal position assurance device.

In some aspects of the method described in any one of the previous paragraphs, each of the least two rows of the array contains a first equal number of terminal cavities and each of the least two columns of the array contains a second equal number of terminal cavities.

In some aspects of the method described in any one of the previous paragraphs, each electrical terminal of the plurality of electrical terminals has a connection end configured to connect with a corresponding mating terminal and an attachment end connected to an electrical cable and wherein the edge of each electrical terminal of the plurality of electrical terminals is closer to the attachment end than the connection end.

In some aspects of the method described in any one of the previous paragraphs, each electrical terminal of the plurality of electrical terminals has a generally tubular shape.

BRIEF DESCRIPTION OF THE DRAWINGS

The present invention will now be described, by way of example with reference to the accompanying drawings, in which.

DETAILED DESCRIPTION

Figure 1A:
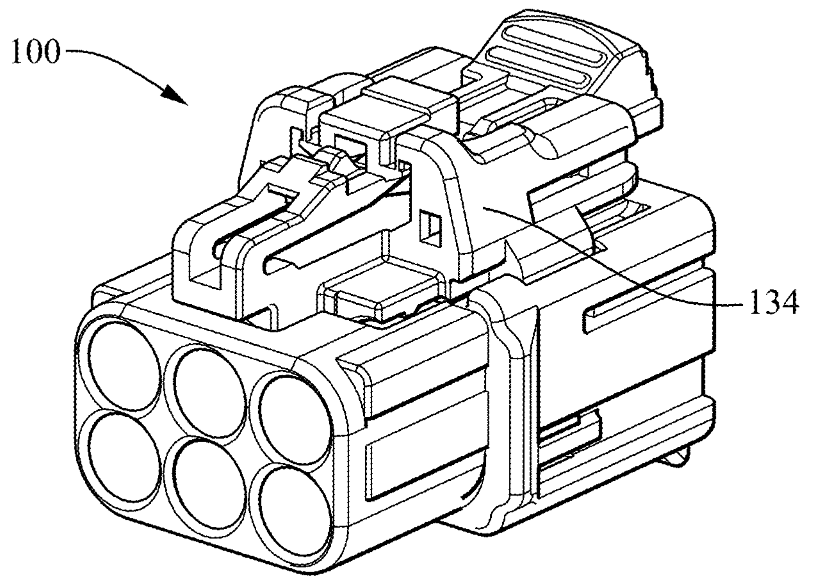
FIG. 1A is an isometric view of an electrical connector in accordance with some embodiments.
Figure 1B:
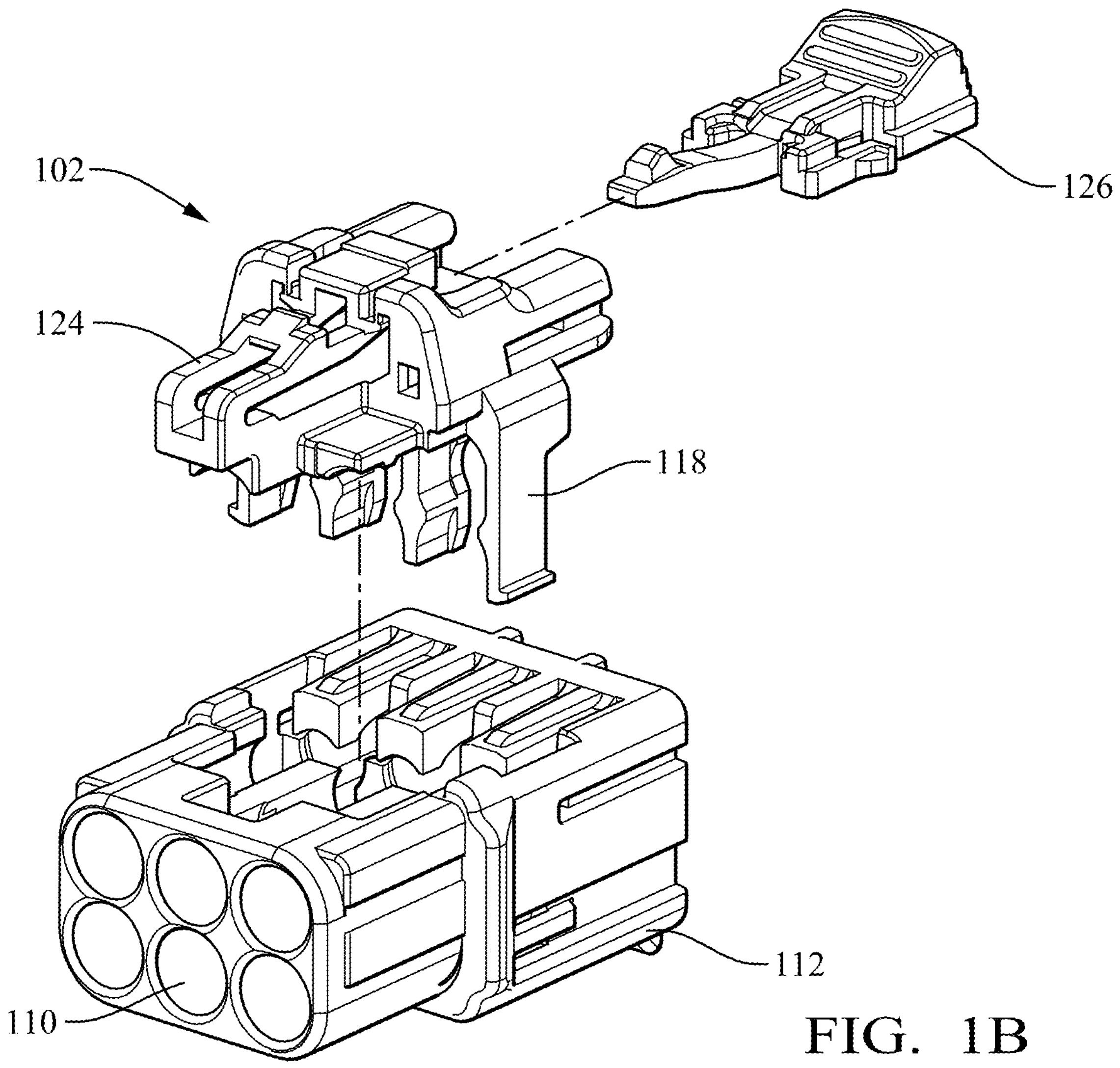
FIG. 1B is an exploded view of the electrical connector of FIG. 1 in accordance with some embodiments.

An electrical connector 100 described herein and shown in FIGS. 1A and 1B includes a secondary locking mechanism 102 in the form of a comb-type secondary terminal lock. The secondary locking mechanism 102 is blocked B from moving from a pre-staged position 104 to a staged position 106 when all of the electrical terminals 108 are not properly seated in the terminal cavities 110 in the connector housing 112 as shown in FIGS. 5, 6B, 10A, and 10B. This indicates to an assembly operator that that at least one electrical terminal 108 is improperly seated in a terminal cavity 110. The inhibition of the secondary locking mechanism 102 to move to the staged position 106 also prevents the electrical connector 100 from mating with the corresponding mating electrical connector (not shown), thereby providing additional indication that at least one electrical terminal 108 is improperly seated and the assembly operator should take corrective action to properly seat all of the electrical terminals 108 in the terminal cavities 110.

Figure 2A:
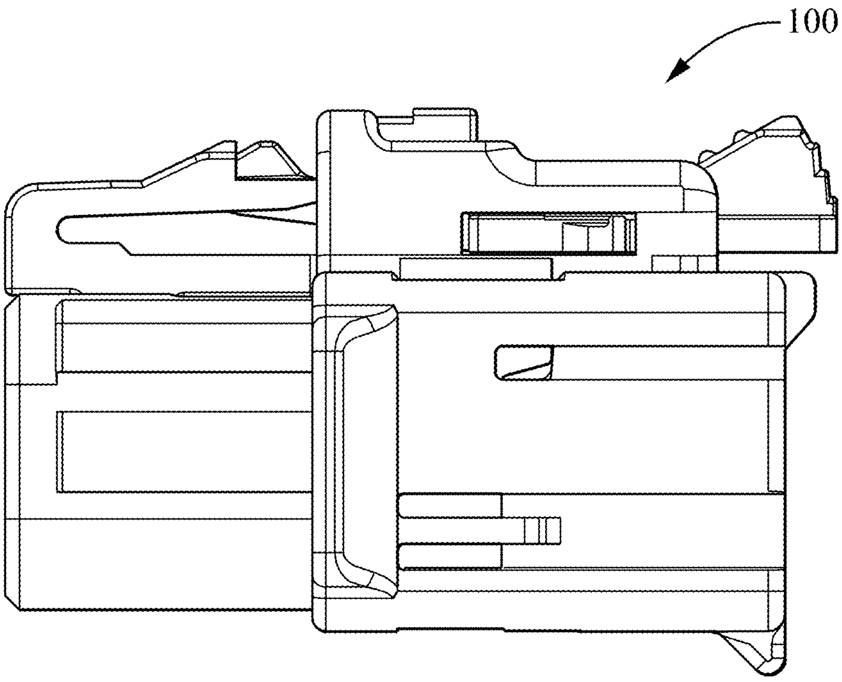
FIG. 2A is a side view of the electrical connector of FIG. 1 in accordance with some embodiments.
Figure 2B:
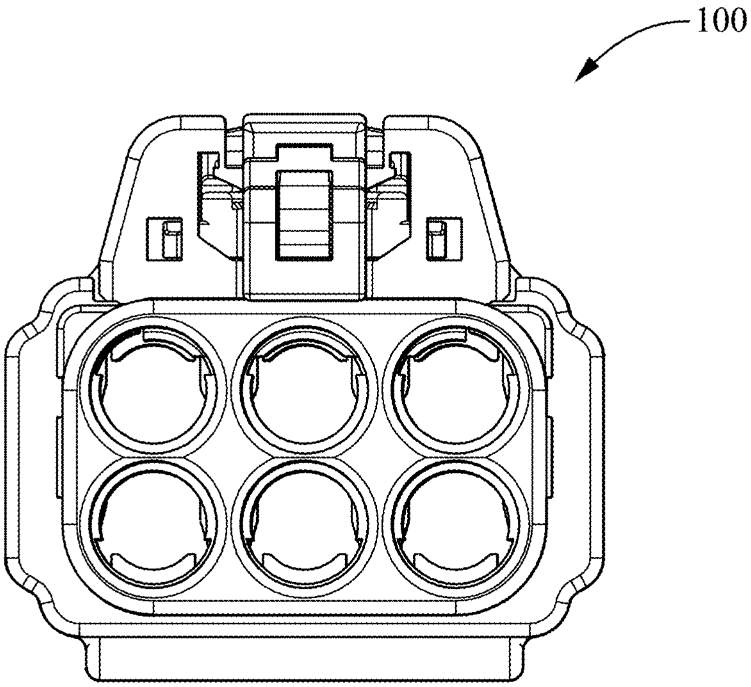
FIG. 2B is an end view of the electrical connector of FIG. 1 in accordance with some embodiments.
Figure 3A:
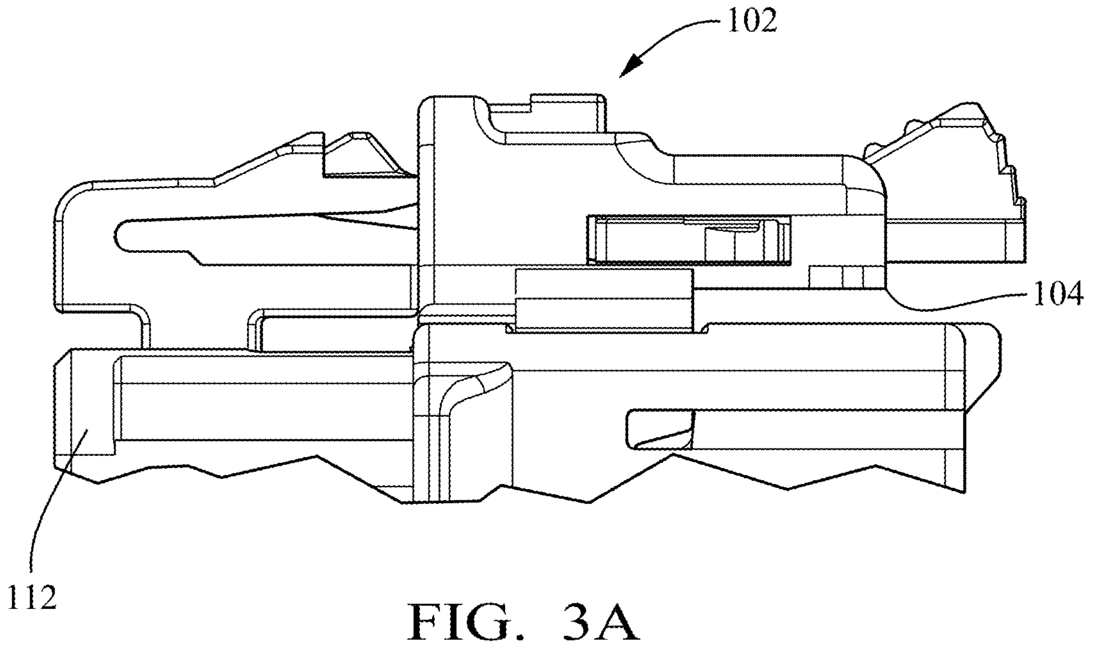
FIG. 3A is aside view of a secondary locking mechanism of the electrical connector of FIG. 1 in a pre-staged position accordance with some embodiments.
Figure 3B:
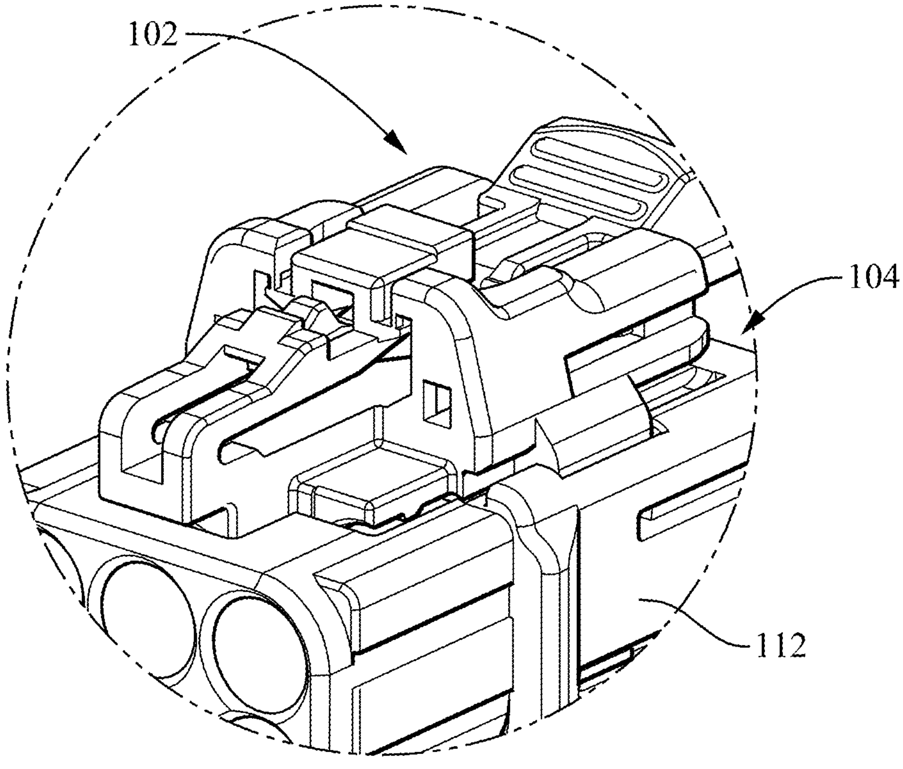
FIG. 3B is an isometric view of the secondary locking mechanism of FIG. 3A in the pre-staged position accordance with some embodiments.
Figure 4A:
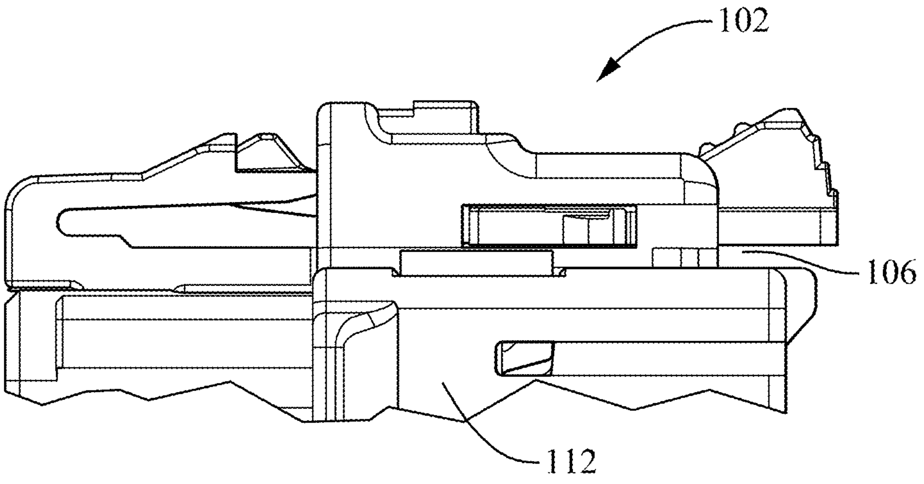
FIG. 4A is aside view of a secondary locking mechanism of the electrical connector of FIG. 1 in a staged position accordance with some embodiments.
Figure 4B:
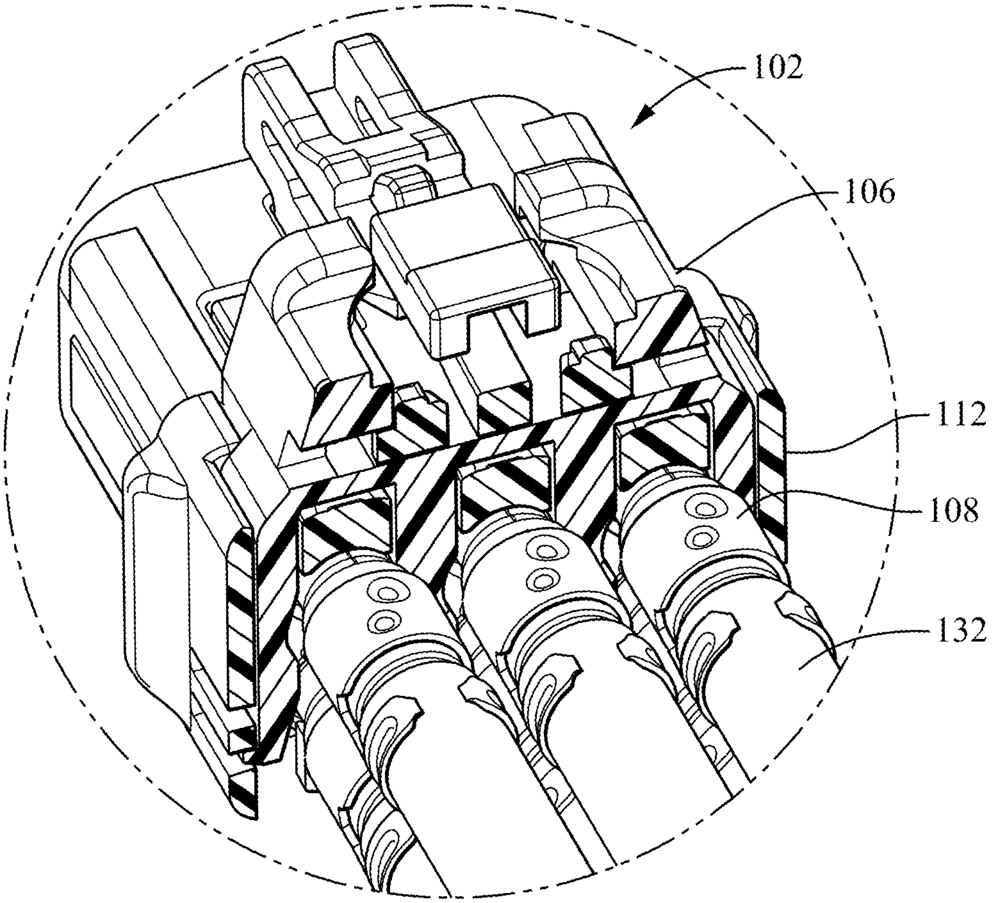
FIG. 4B is an isometric view of the secondary locking mechanism of FIG. 4A in the staged position accordance with some embodiments.
Figure 5:
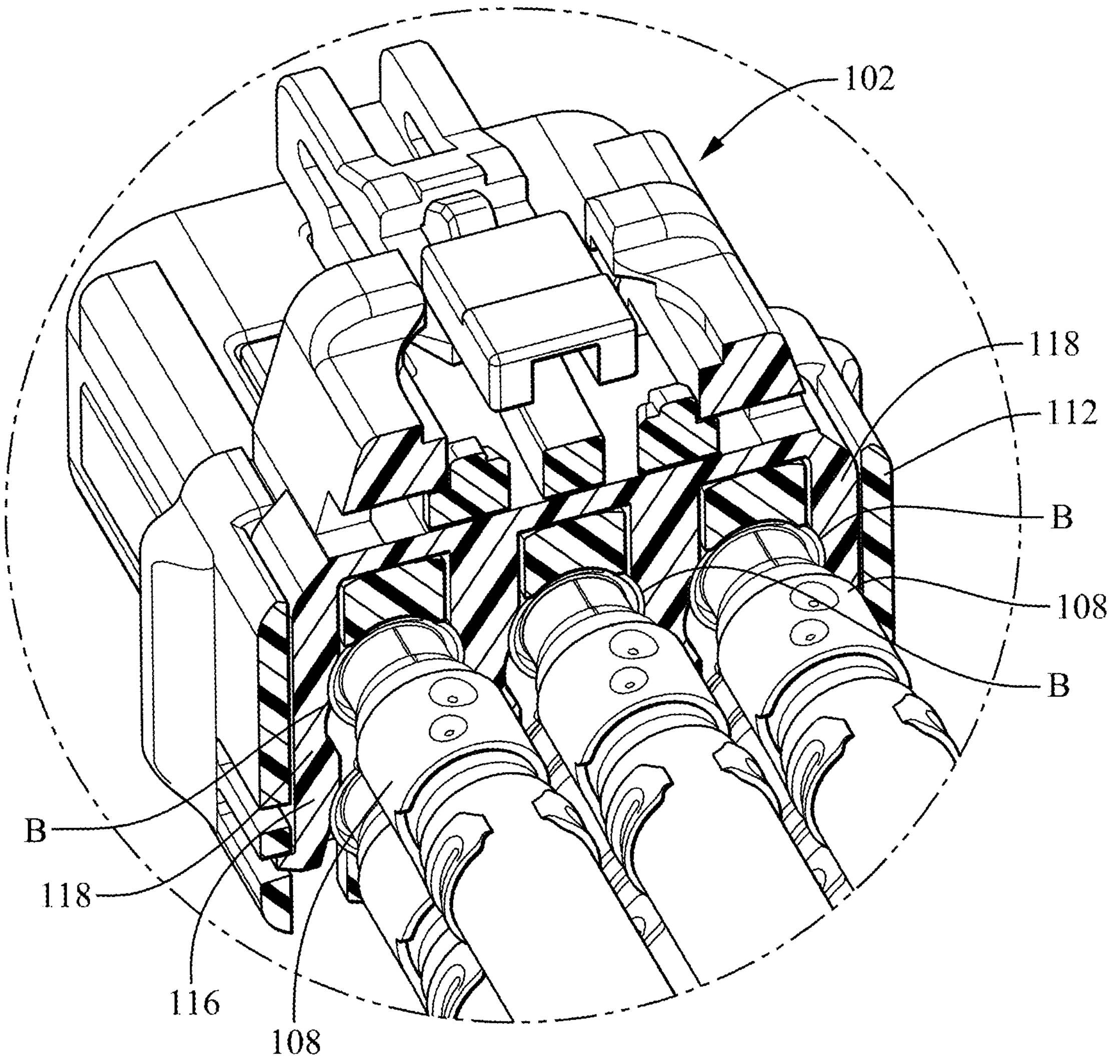
FIG. 5 is an isometric view of the secondary locking mechanism held in the pre-staged position due to improperly seated terminal in accordance with some embodiments.
Figure 6A:
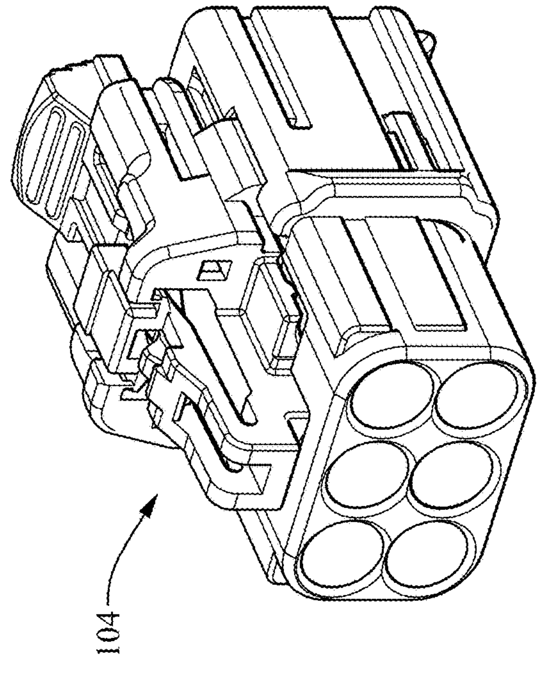
FIG. 6A is another isometric view of the secondary locking mechanism of FIG. 3A in the pre-staged position accordance with some embodiments.
Figure 6B:
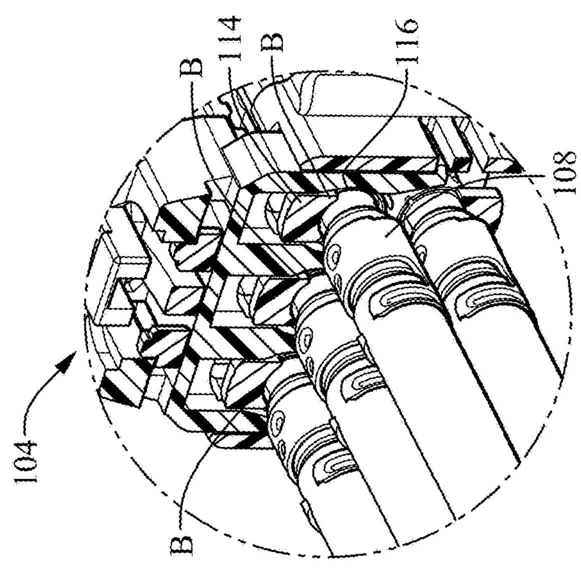
FIG. 6B is another isometric view of the secondary locking mechanism held in the pre-staged position due to improperly seated terminal in accordance with some embodiments.
Figure 6C:
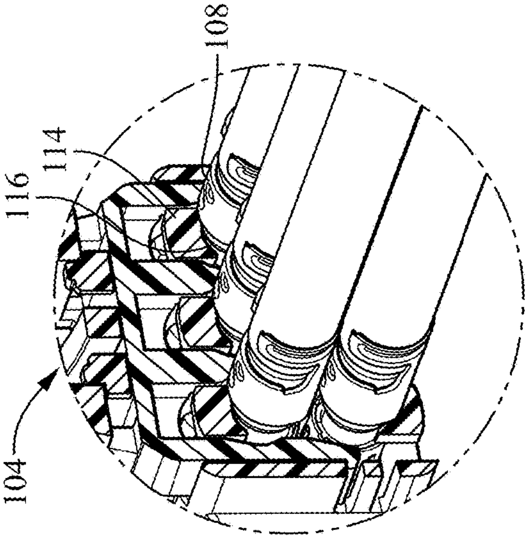
FIGS. 6C and 6D are isometric views showing the secondary locking mechanism moving from the pre-staged position due to the staged position when all terminals are properly seated in accordance with some embodiments.
Figure 6D:
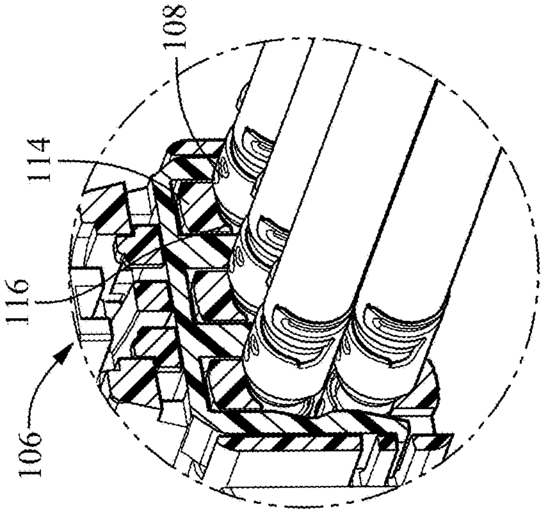
Figure 7A:
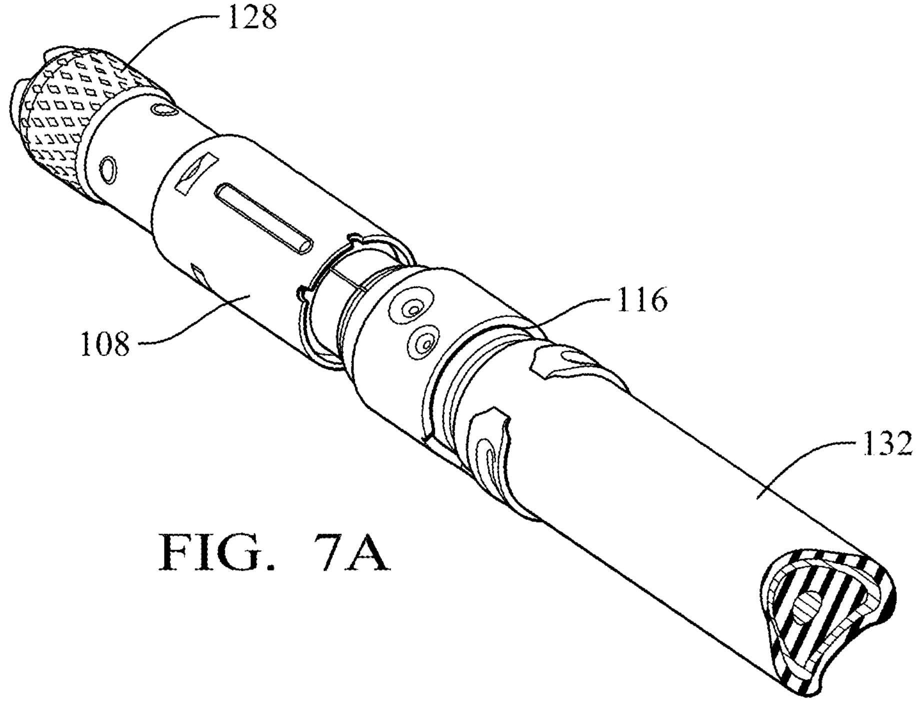
FIG. 7A is an isometric view of the terminal showing an edge in accordance with some embodiments.
Figure 7B:
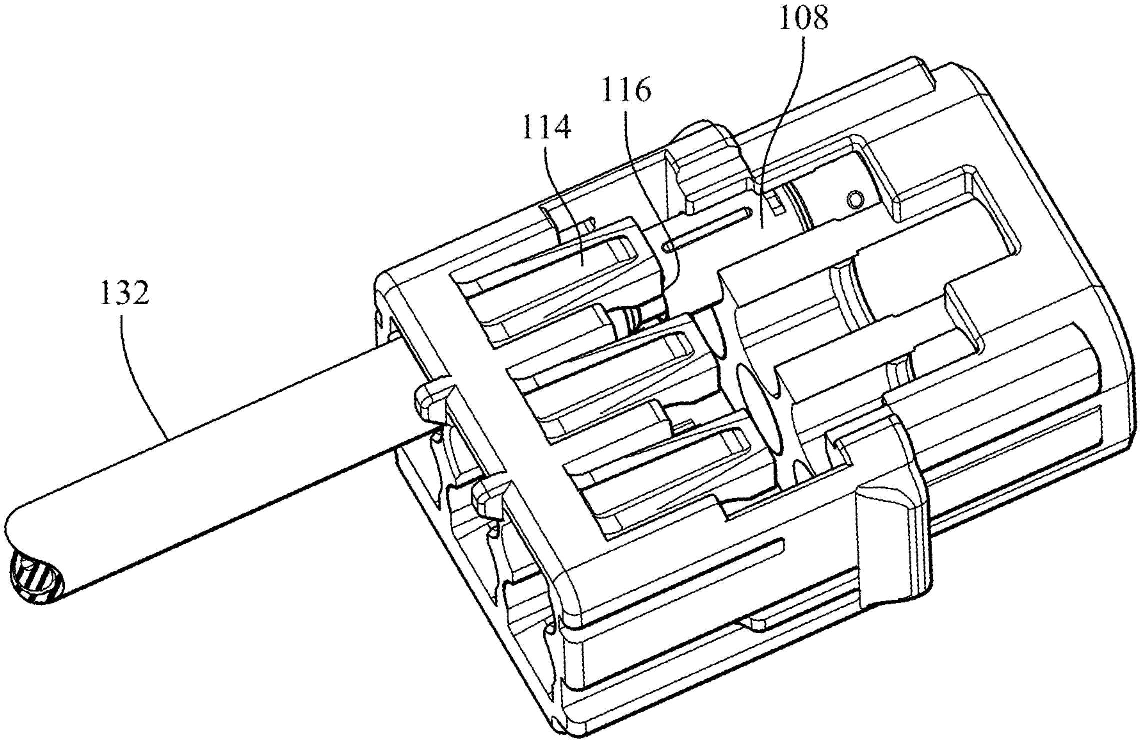
FIG. 7B is an isometric view of a primary locking mechanism engaging the edge of the terminal shown in FIG. 7A in accordance with some embodiments.
Figure 8A:
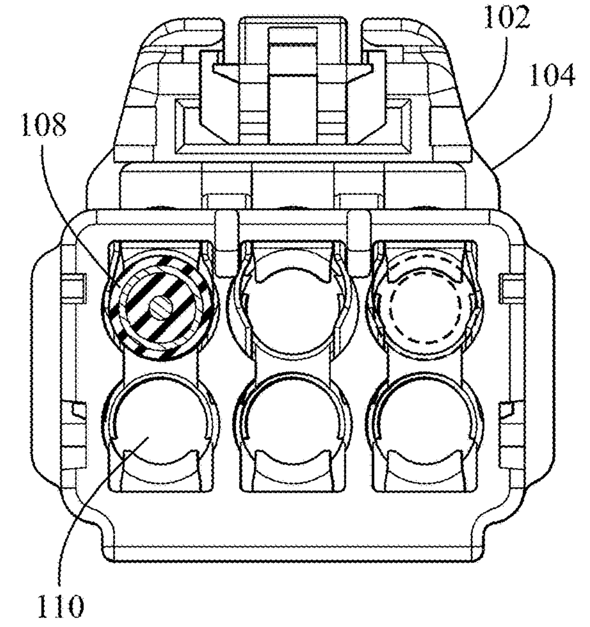
FIG. 8A shows an end view of the electrical connector with the secondary locking mechanism in the pre-staged position in accordance with some embodiments.
Figure 8B:
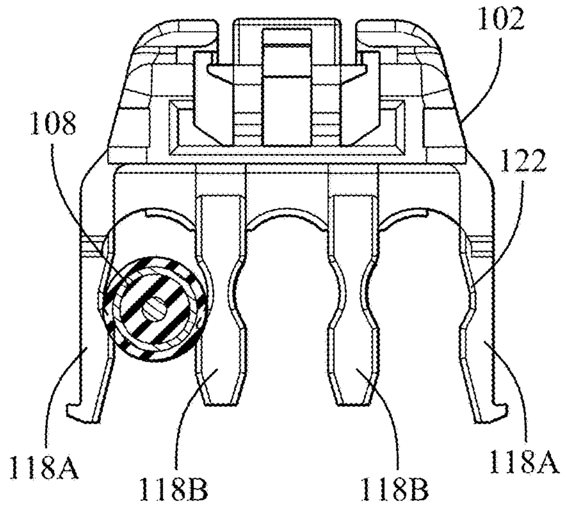
FIG. 8B shows the same end view of the electrical connector of FIG. 8A with the connector housing removed in accordance with some embodiments.
Figure 9A:
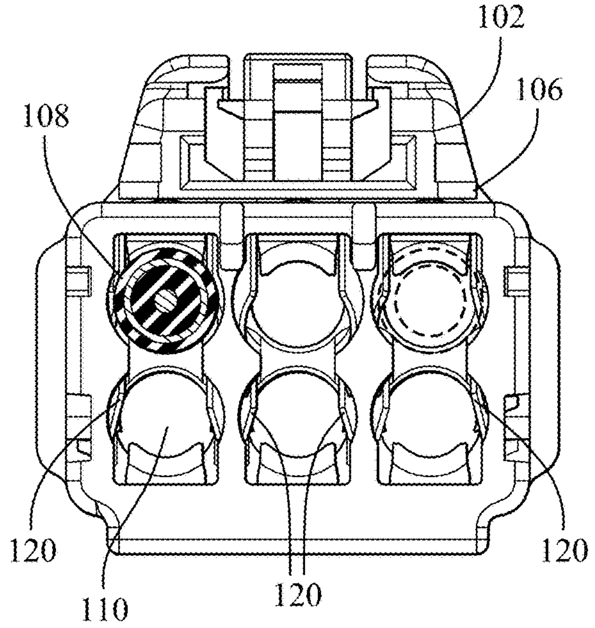
FIG. 9A shows an end view of the electrical connector with the secondary locking mechanism in the staged position in accordance with some embodiments.
Figure 9B:
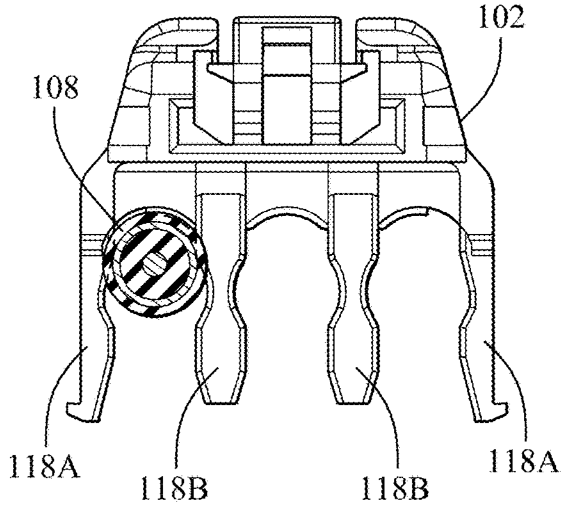
FIG. 9B shows the same end view of the electrical connector of FIG. 9A with the connector housing removed in accordance with some embodiments.
Figure 10A:
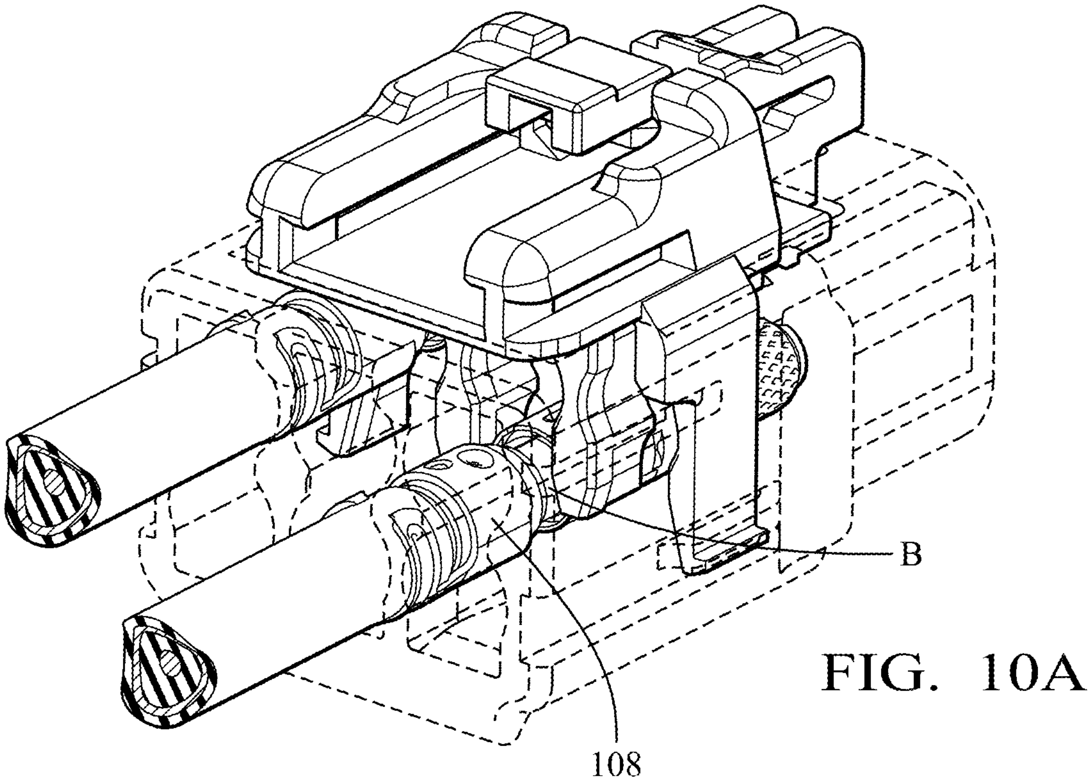
FIG. 10A shows an X-ray view of the electrical connector with one terminal improperly seated in a terminal cavity an the secondary locking mechanism held in the pre-staged position in accordance with some embodiments.
Figure 10B:
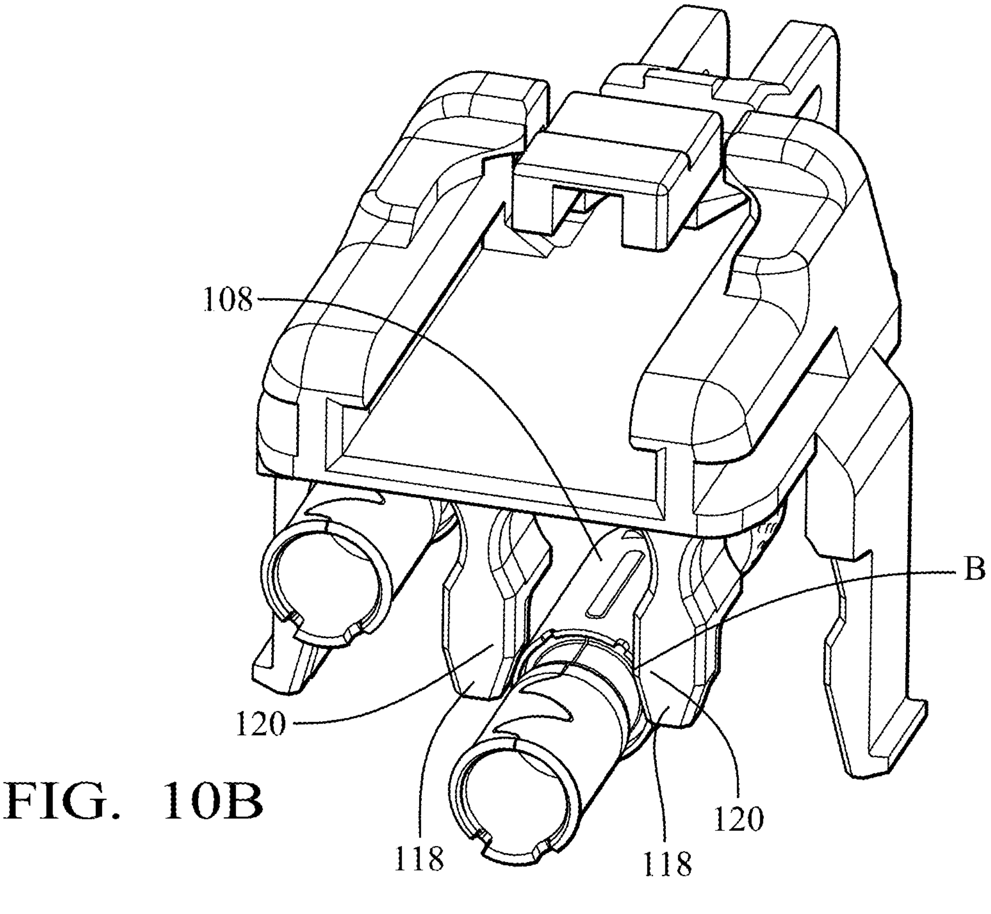
FIG. 10B shows the view of the electrical connector of FIG. 10A with the connector housing removed in accordance with some embodiments.

The electrical connector 100 includes the connector housing that defines the terminal cavities 110 extending therethrough, as best shown in FIG. 2B. The terminal cavities 110 are arranged in an array having at least two rows and at least two columns, in the illustrated example two rows and three columns. Each row of the array may contain a number of terminal cavities 110 that is equal to every other row of cavities and each column of the array may contain a number of terminal cavities 110 that is equal to every other column of cavities. Each of the terminal cavities 110 are configured to receive one of the electrical terminals 108. Each terminal cavity defines a flexible primary locking mechanism 114 that is integrally formed with the connector housing 112. The flexible primary locking mechanism 114, see FIG. 7B, is configured to engage an edge 116, see FIG. 7A of the electrical terminal 108, thereby inhibiting removal of the electrical terminal 108 from the terminal cavity 110. The electrical connector 100 also includes the secondary locking mechanism 102 that is slidably attached to the connector housing 112. The secondary locking mechanism 102 is movable by pushing the secondary locking mechanism 102 toward the connector housing 112 as shown in FIG. 6A, thereby moving the secondary locking mechanism 102 from the pre-staged position 104 shown in FIGS. 3A, 3B, and 6C to the staged position 106 shown in FIGS. 4A and 4B. As best shown in FIGS. 6D, 8B, 9B, the secondary locking mechanism 102 defines a plurality of members 118 in a comb-like arrangement that are configured to extend into the terminal cavities 110 and engage the edge 116 of at least two electrical terminals 108 when the secondary locking mechanism 102 is in the staged position 106, thereby further inhibiting removal of the electrical terminals 108 from the terminal cavities 110.

The members 118 may define ridges 120 that engage the edge 116 of the electrical terminals 108 when the secondary locking mechanism 102 is in the staged position 106, see FIG. 9B.

The members 118 includes two outer members 118A and one or more inner members 118B. The inner members 118B engage the edges 116 of twice as many of the electrical terminals 108 as the two outer members 118A.

The members 118 may be sized, shaped, and arranged to allow each of the terminal cavities 110 to receive one electrical terminal 108 when the secondary locking mechanism 102 is in the pre-staged position 104.

A side 122 of the members 118 may be scalloped to allow each of the terminal cavities 110 to receive one electrical terminal 108 when the secondary locking mechanism 102 is in the pre-staged position 104.

Interference between at least one of the members 118 and at least one of the electrical terminals 108 that is not fully inserted within one of the terminal cavities 110 may inhibit the secondary locking mechanism 102 from moving from the pre-staged position 104 to the staged position 106, thereby indicating an improperly seated terminal.

The secondary locking mechanism 102 may include a connector locking mechanism 124 configured to attach the electrical connector to a corresponding mating electrical connector (not shown) and a connector position assurance (CPA) device 126. The integration of the connector locking mechanism 124 into the secondary locking mechanism 102 provides the benefit of blocking the electrical connector 100 from mating with a corresponding mating connector (not shown) because the connector locking mechanism 124 is raised from the connector housing 112 when the secondary locking mechanism 102 is in the pre-staged position 104, thereby. The integration of the connector locking mechanism 124 into the secondary locking mechanism 102 provides the benefit of allowing an equal number of terminal cavities in each row of terminal cavities because the connector locking mechanism 124 does not require elimination of one terminal cavity in the connector housing 112 to be accommodated as was required in previous electrical connector designs.

Each electrical terminal 108 has a connection end 128 configured to connect with a corresponding mating terminal (not shown) and an attachment end 130 connected to an electrical cable 132. The edge 116 of each electrical terminal 108 may be closer to the attachment end 130 than the connection end 128. Each electrical terminal 108 may have a generally tubular shape.

Figure 11:
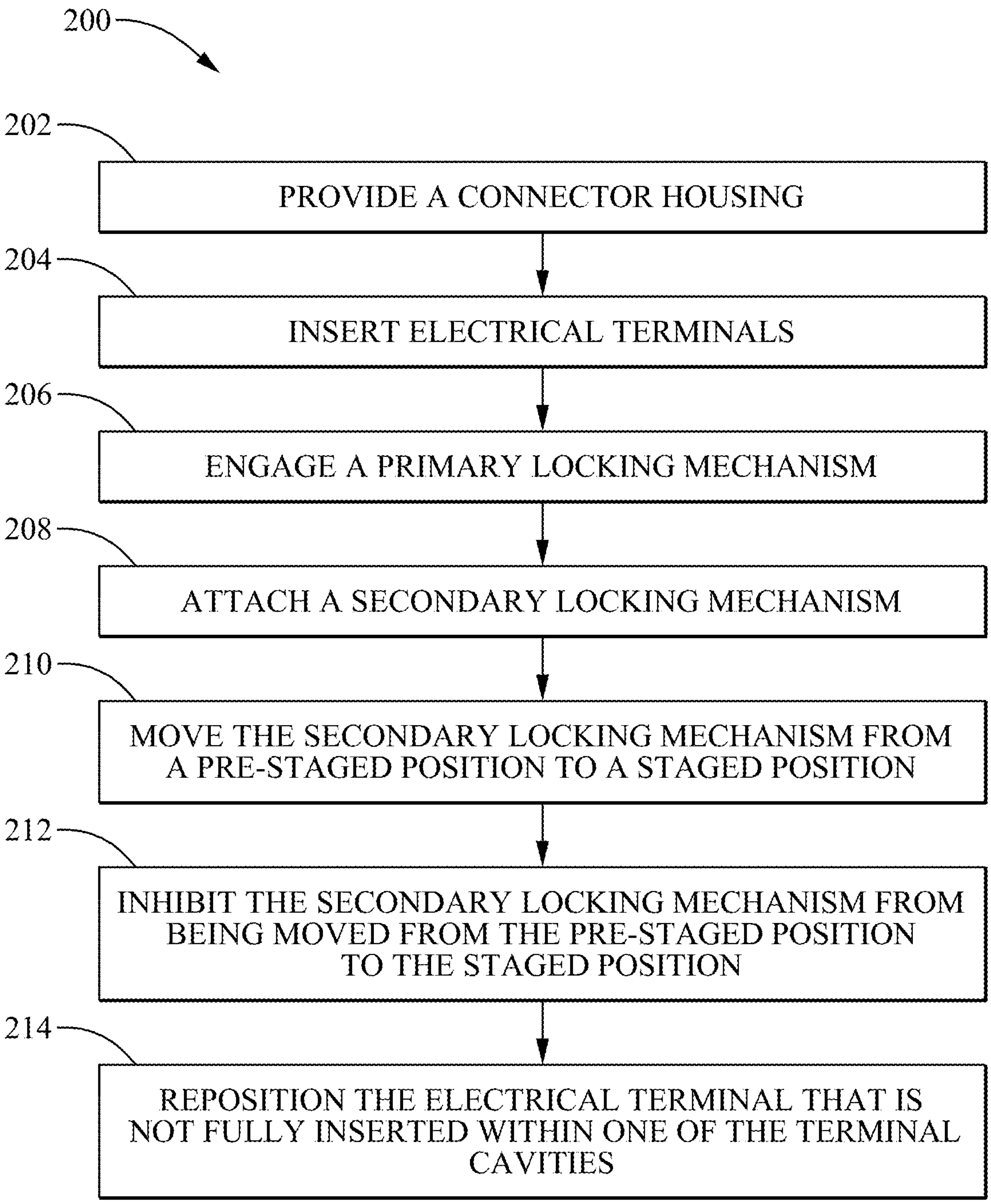
FIG. 11 shows a flow chart of a method of assembling an electrical connector in accordance with some embodiments.

A non-limiting example of a method 200 of assembling an electrical connector is shown in FIG. 11. The method 200 contains the following steps:

STEP 202, PROVIDE A CONNECTOR HOUSING, includes providing a connector housing 112 having terminal cavities 110 extending therethrough which are arranged in an array having at least two rows and at least two columns;

STEP 204, INSERT ELECTRICAL TERMINALS, includes inserting at least two electrical terminals 108 into at least two of the terminal cavities 110;

STEP 206, ENGAGE A PRIMARY LOCKING MECHANISM, includes engaging a flexible primary locking mechanism integrally formed with the connector housing 112 in each of the terminal cavities 110 with an edge 116 of each electrical terminal 108, thereby inhibiting removal of each electrical terminal 108 from each of the terminal cavities 110;

STEP 208, ATTACH A SECONDARY LOCKING MECHANISM, includes slidably attaching a secondary locking mechanism 102 to the connector housing 112; and STEP 210, MOVE THE SECONDARY LOCKING MECHANISM FROM A PRE-STAGED POSITION TO A STAGED POSITION, includes moving the secondary locking mechanism 102 from a pre-staged position 104 to a staged position 106 such that a plurality of members 118 defined by the secondary locking mechanism 102 extend into the terminal cavities 110 and engage the edge 116 of at least one of the electrical terminals 108 when each of each electrical terminal 108 is fully seated in the terminal cavities 110, thereby further inhibiting removal of the plurality of electrical terminals 108 from the terminal cavities 110.

The method may further contain STEP 212, INHIBIT THE SECONDARY LOCKING MECHANISM FROM BEING MOVED FROM THE PRE-STAGED POSITION TO THE STAGED POSITION, which includes inhibiting the secondary locking mechanism 102 from being moved from the pre-staged position 104 to the staged position 106 due to interference between at least one of the members 118 and at least one of the electrical terminals 108 that is not fully inserted within one of the terminal cavities 110, thereby indicating an improperly seated terminal.

The method may additionally incorporate STEP 214, REPOSITION THE ELECTRICAL TERMINAL THAT IS NOT FULLY INSERTED WITHIN ONE OF THE TERMINAL CAVITIES, which includes repositioning the electrical terminal 108 that is not fully inserted within one of the terminal cavities 110 such that the electrical terminal 108 is fully seated within the terminal cavity 110.

The members 118 may define ridges 120 that engage the edge 116 of at least one electrical terminal 108 when the secondary locking mechanism 102 is in the staged position 106.

The members 118 include two outer members 118A and one or more inner members 118B. The inner members 118B engage the edges 116 of twice as many of the electrical terminals 108 as the two outer members 118A.

The members 118 are sized, shaped, and arranged to allow each of the terminal cavities 110 to receive one electrical terminal 108 when the secondary locking mechanism 102 is in the pre-staged position 104.

A side 122 of the members 118 are scalloped to allow each of the terminal cavities 110 to receive one electrical terminal 108 when the secondary locking mechanism 102 is in the pre-staged position 104.

The secondary locking mechanism 102 includes a connector locking mechanism 124 configured to attach the electrical connector to a corresponding mating electrical connector (not shown) and a terminal position assurance device 126.

Each of the least two rows of the array may contain a first equal number of terminal cavities and each of the least two columns of the array contains a second equal number of terminal cavities.

Each electrical terminal 108 has a connection end 128 configured to connect with a corresponding mating terminal (not shown) and an attachment end 130 connected to an electrical cable 132. The edge 116 of each electrical terminal 108 may be closer to the attachment end 130 than the connection end 128.

Each electrical terminal 108 has a generally tubular shape.

The secondary locking mechanism 102 additionally provides the benefit of a more accessible and larger pushing surface 134 than other electrical connectors of a comparable size. The secondary locking mechanism 102 also reduces the number of components in the electrical connector 100 compared to an electrical connector having two separate secondary locking mechanisms attached to the connector housing, such as the electrical connector shown in U.S. Patent Application Publication No. 2022/0006235 A1.

While the illustrated examples show a miniature coaxial connector, alternative embodiments may be envisioned that could be applied to single core terminals and housings in addition to other coaxial connectors.

While this invention has been described in terms of the preferred embodiments thereof, it is not intended to be so limited, but rather only to the extent set forth in the claims that follow. For example, the above-described embodiments (and/or aspects thereof) may be used in combination with each other. In addition, many modifications may be made to configure a particular situation or material to the teachings of the invention without departing from its scope. Dimensions, types of materials, orientations of the various components, and the number and positions of the various components described herein are intended to define parameters of certain embodiments and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any particular order, order of operations, direction or orientation unless stated otherwise.

We claim:

1. An electrical connector, comprising:

a connector housing having terminal cavities extending therethrough which are arranged in an array having at least two rows and at least two columns, each of the terminal cavities configured to receive one electrical terminal of a plurality of electrical terminals, wherein each terminal cavity defines a flexible primary locking mechanism integrally formed with the connector housing and configured to engage an edge of at least one electrical terminal of the plurality of electrical terminals, thereby inhibiting removal of the plurality of electrical terminals from the terminal cavities;

a secondary locking mechanism slidably attached to the connector housing and movable from a pre-staged position to a staged position and defining a plurality of members configured to extend into the terminal cavities and engage the edge of at least two electrical terminals of the plurality of electrical terminals when the secondary locking mechanism is in the staged position, thereby further inhibiting removal of the plurality of electrical terminals from the terminal cavities; and wherein the secondary locking mechanism includes a connector locking mechanism configured to attach the electrical connector to a corresponding mating electrical connector and a terminal position assurance device.

2. The electrical connector according to claim 1, wherein the plurality of members define ridges that engage the edge of at least one of the plurality of electrical terminals when the secondary locking mechanism is in the staged position.

3. The electrical connector according to claim 1, wherein the plurality of members include two outer members and at least one inner member and wherein the at least one inner member engages the edges of twice as many of the plurality of electrical terminals as the two outer members.

4. The electrical connector according to claim 1, wherein the plurality of members is sized, shaped, and arranged to allow each of the terminal cavities to receive one electrical terminal of the plurality of electrical terminals when the secondary locking mechanism is in the pre-staged position.

5. The electrical connector according to claim 4, wherein a side of the plurality of members is scalloped to allow each of the terminal cavities to receive one electrical terminal of the plurality of electrical terminals when the secondary locking mechanism is in the pre-staged position.

6. The electrical connector according to claim 1, wherein interference between at least one of the plurality of members and at least one of the plurality of electrical terminals that is not fully inserted within one of the terminal cavities inhibits the secondary locking mechanism from moving from the pre-staged position to the staged position, thereby indicating an improperly seated terminal.

7. The electrical connector according to claim 1, wherein each of the least two rows of the array contains a first equal number of terminal cavities and each of the least two columns of the array contains a second equal number of terminal cavities.

8. The electrical connector according to claim 1, wherein each electrical terminal of the plurality of electrical terminals has a connection end configured to connect with a corresponding mating terminal and an attachment end connected to an electrical cable and wherein the edge of each electrical terminal of the plurality of electrical terminals is closer to the attachment end than the connection end.

9. The electrical connector according to claim 8, wherein each electrical terminal of the plurality of electrical terminals has a generally tubular shape.

10. A method of assembling an electrical connector, comprising:

providing a connector housing having terminal cavities extending therethrough which are arranged in an array having at least two rows and at least two columns;

inserting at least two electrical terminals of a plurality of electrical terminals into at least two of the terminal cavities;

engaging a flexible primary locking mechanism integrally formed with the connector housing in each of the terminal cavities with an edge of each electrical terminal of the plurality of electrical terminals, thereby inhibiting removal of each electrical terminal of the plurality of electrical terminals from each of the terminal cavities;

slidably attaching a secondary locking mechanism to the connector housing;

moving the secondary locking mechanism from a pre-staged position to a staged position such that a plurality of members defined by the secondary locking mechanism extend into the terminal cavities and engage the edge of at least one of the plurality of electrical terminals when each of the plurality of electrical terminals is fully seated in the terminal cavities, thereby further inhibiting removal of the plurality of electrical terminals from the terminal cavities; and wherein the secondary locking mechanism includes a connector locking mechanism configured to attach the electrical connector to a corresponding mating electrical connector and a terminal position assurance device.

11. The method according to claim 10, further comprising:

inhibiting the secondary locking mechanism from being moved from the pre-staged position to the staged position due to interference between at least one of the plurality of members and at least one of the plurality of electrical terminals that is not fully inserted within one of the terminal cavities, thereby indicating an improperly seated terminal.

12. The method according to claim 10, further comprising:

repositioning the at least one of the plurality of electrical terminals that is not fully inserted within one of the terminal cavities such that it is fully seated within the terminal cavity.

13. The method according to claim 10, wherein the plurality of members include two outer members and at least one inner member and wherein the at least one inner member engages the edges of twice as many of the plurality of electrical terminals as the two outer members.

14. The method according to claim 10, wherein the plurality of members is sized, shaped, and arranged to allow each of the terminal cavities to receive one electrical terminal of the plurality of electrical terminals when the secondary locking mechanism is in the pre-staged position.

15. The method according to claim 14, wherein a side of the plurality of members is scalloped to allow each of the terminal cavities to receive one electrical terminal of the plurality of electrical terminals when the secondary locking mechanism is in the pre-staged position.

16. The method according to claim 10, wherein each of the least two rows of the array contains a first equal number of terminal cavities and each of the least two columns of the array contains a second equal number of terminal cavities.

17. The method according to claim 10, wherein each electrical terminal of the plurality of electrical terminals has a connection end configured to connect with a corresponding mating terminal and an attachment end connected to an electrical cable and wherein the edge of each electrical terminal of the plurality of electrical terminals is closer to the attachment end than the connection end.

18. The method according to claim 17, wherein each electrical terminal of the plurality of electrical terminals has a generally tubular shape.

* * * * *